United States Patent
Tan

(12) United States Patent  (10) Patent No.: US 8,011,736 B2
(45) Date of Patent: Sep. 6, 2011

(54) COLLAPSIBLE WHEEL

(76) Inventor: Fu-Hsing Tan, Taoyuan Hsien (TW)

(*) Notice: Subject to any disclaimer, the term of this patent is extended or adjusted under 35 U.S.C. 154(b) by 0 days.

(21) Appl. No.: 12/348,303

(22) Filed: Jan. 4, 2009

(65) Prior Publication Data
US 2011/0080038 A1    Apr. 7, 2011

(51) Int. Cl.
*B60B 25/02*    (2006.01)
(52) U.S. Cl. ............................... 301/32; 301/5.1; 301/31
(58) Field of Classification Search .................... 301/5.1, 301/15, 30, 31, 32, 33, 34, 38.1, 40.2, 40.6; 152/11, 12, 69, 75, 76, 80; 305/3; 180/8.2; 280/5.2
See application file for complete search history.

(56) References Cited

U.S. PATENT DOCUMENTS

| | | | | |
|---|---|---|---|---|
| 1,028,172 A * | 6/1912 | Wright | ............................. | 152/11 |
| 1,094,956 A * | 4/1914 | Wickman | ........................... | 152/7 |
| 1,437,105 A * | 11/1922 | Howell | ........................... | 301/17 |
| 1,463,042 A * | 7/1923 | Krysiak | ........................... | 301/5.1 |
| 2,454,130 A * | 11/1948 | Braun | ............................. | 301/5.1 |
| 3,179,431 A * | 4/1965 | Pikl | ................................ | 280/5.2 |
| 3,226,129 A * | 12/1965 | McKinley | ..................... | 280/5.2 |
| 3,684,180 A * | 8/1972 | Gorzell | ......................... | 239/733 |
| 4,056,285 A * | 11/1977 | Wright | ............................. | 301/8 |

* cited by examiner

*Primary Examiner* — Russell Stormer

(57) ABSTRACT

A collapsible wheel includes a rim formed of a number of arched rim elements pivotally connected into an endless series, a connector with a shaft for connection to a golf bag carrier, pushcart or baby cart, a hub sleeved onto the shaft of the connector, first spokes each having one end connected to the rim and the other end for stopping against the periphery of the hug, and second spokes each having an outer spoke segment connected to the rim and an inner spoke segment that has one end hinged to the outer spoke segment and the other end hinged to the hub.

7 Claims, 5 Drawing Sheets

COLLAPSIBLE WHEEL

BACKGROUND OF THE INVENTION

1. Field of the Invention

The present invention relates to vehicle wheels and more particularly, to a collapsible wheel practical for use in a golf bag carrier, pushcart, or baby cart.

2. Description of the Related Art

Many folding collapsible pushcarts and baby carts are commercially available. When not in use, these collapsible pushcarts and baby carts can be folded into a collapsed status, reducing storage occupation. However, the wheels of a collapsible pushcart or baby cart have a round shape and are not collapsible. When putting a collapsible pushcart or baby cart in the trunk of a car, the round wheels of the collapsed collapsible pushcart or baby cart still occupy much space in the trunk.

SUMMARY OF THE INVENTION

The present invention has been accomplished under the circumstances in view. It is the main object of the present invention to provide a wheel for cart, which is collapsible.

To achieve this and other objects of the present invention, a collapsible wheel comprises a rim, a connector, a hub, and a spike unit. The rim is formed of a plurality of arched ring elements that are pivotally connected in an endless series. The connector comprises a plurality of sliding arranged on one side thereof and extending across one another at the center of the connector, and a shaft perpendicularly extended from the center of the connector and pivotally connected to a vehicle that can be a golf bag carrier, pushcart or baby cart. The hub is sleeved onto the shaft of the connector and movable along the shaft. The spoke unit is connected between the rim and the hub to support the rim in shape. The spoke unit comprises a plurality of first spokes and a plurality of second spokes respectively movably attached to the sliding ways of the connector. Each first spoke has an outer end fixedly connected to the rim, and an inner end for stopping against the periphery of the hub. Each second spoke comprises an outer spoke segment fixedly connected to the rim, and an inner spoke segment that has one end hinged to the distal end of the outer spoke segment remote from the rim and the other end hinged to the hub. By means of pulling the hub along the shaft in direction away from the connector, the first spokes and the second spokes are moved relative to the connector, thereby collapsing the rim.

DETAILED DESCRIPTION OF THE PREFERRED EMBODIMENT

Figure 1:
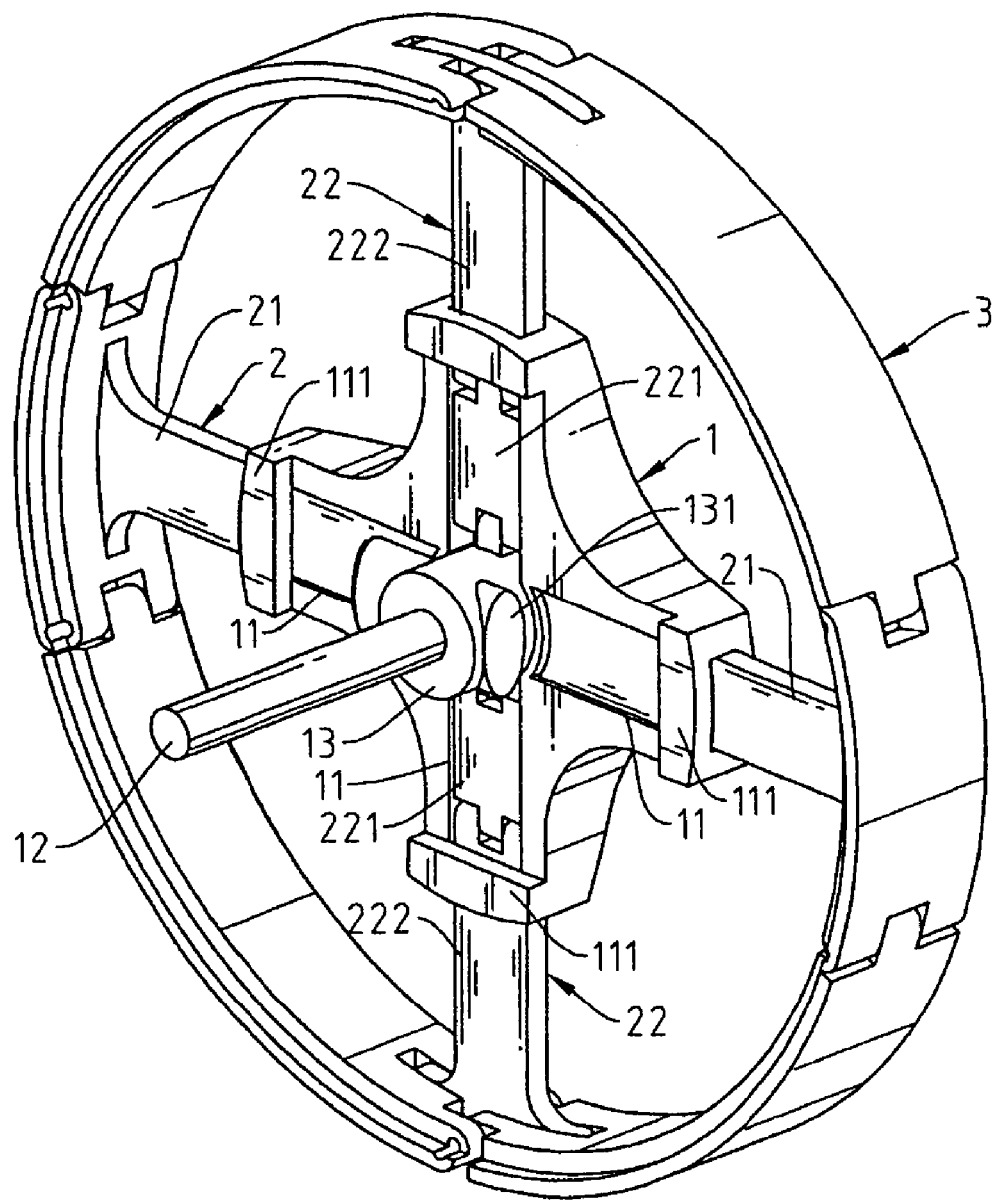
FIG. 1 is an elevational view of a wheel for cart in accordance with the present invention.
Figure 2:
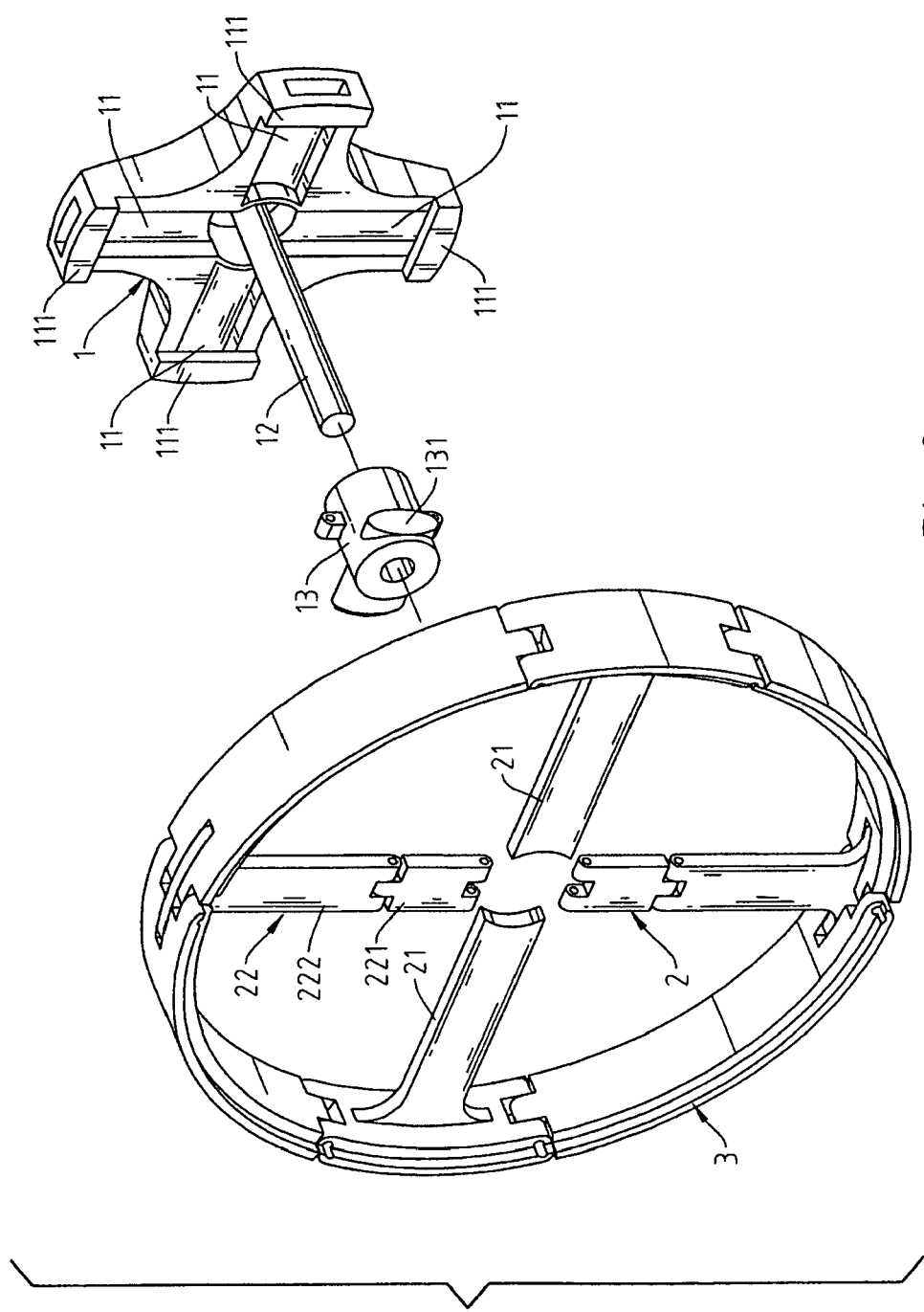
FIG. 2 is an exploded view of the wheel for cart in accordance with the present invention.

Referring to FIGS. 1 and 2, a collapsible wheel for cart in accordance with the present invention comprises a connector 1, a hub 13, a spoke unit 2, and a rim 3.

The connector 1 has two sliding ways 11 longitudinally and transversely arranged in a crossed manner, four eye lugs 111 respectively disposed at the distal ends of the sliding ways 11, and a shaft 12 perpendicularly extended from the center, i.e., the crossed point of the sliding ways 11 for connection to a vehicle frame of a vehicle (not shown). The hub 13 is sleeved onto the shaft 12, having two retaining portions 131 perpendicularly extended from the periphery at two opposite sides.

The spoke unit 2 comprises two first spokes 21 and two second spokes 22. The first spokes 21 are respectively inserted through two opposite eye lugs 111 of the connector 1 into one sliding way 11, each having an outer end respectively fixedly connected to the inner diameter of the rim 3. The second spokes 22 are respectively inserted through the other two opposite eye legs 111 of the connector 1 into the other sliding way 11, each comprising an outer spoke segment 222 that is fixedly connected to the inner diameter of the rim 3, and an inner spoke segment 221 that has one end hinged to the distal end of the outer spoke segment 222 remote from the rim 3 and the other end hinged to the hub 13.

The rim 3 is made by means of pivotally connecting a plurality of arched ring elements in series.

Figure 3:
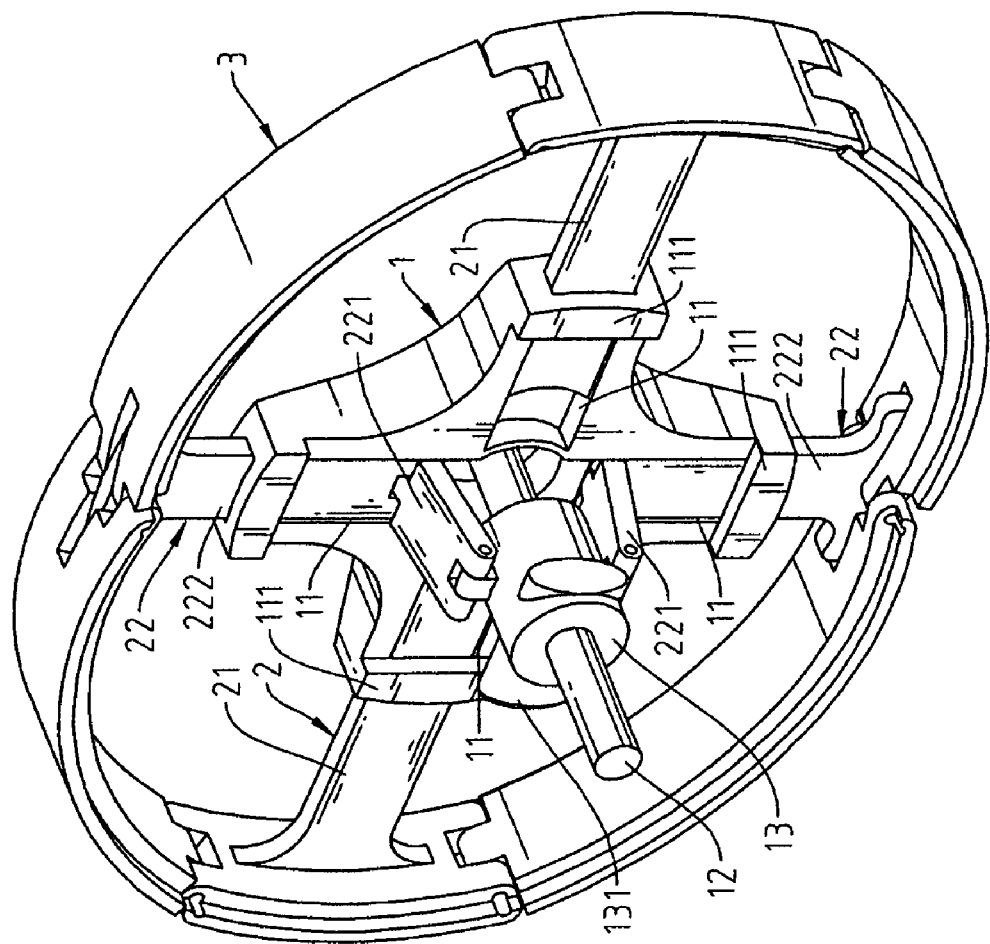
FIG. 3 is an elevational view of the present invention, showing the wheel for cart collapsed.
Figure 4:
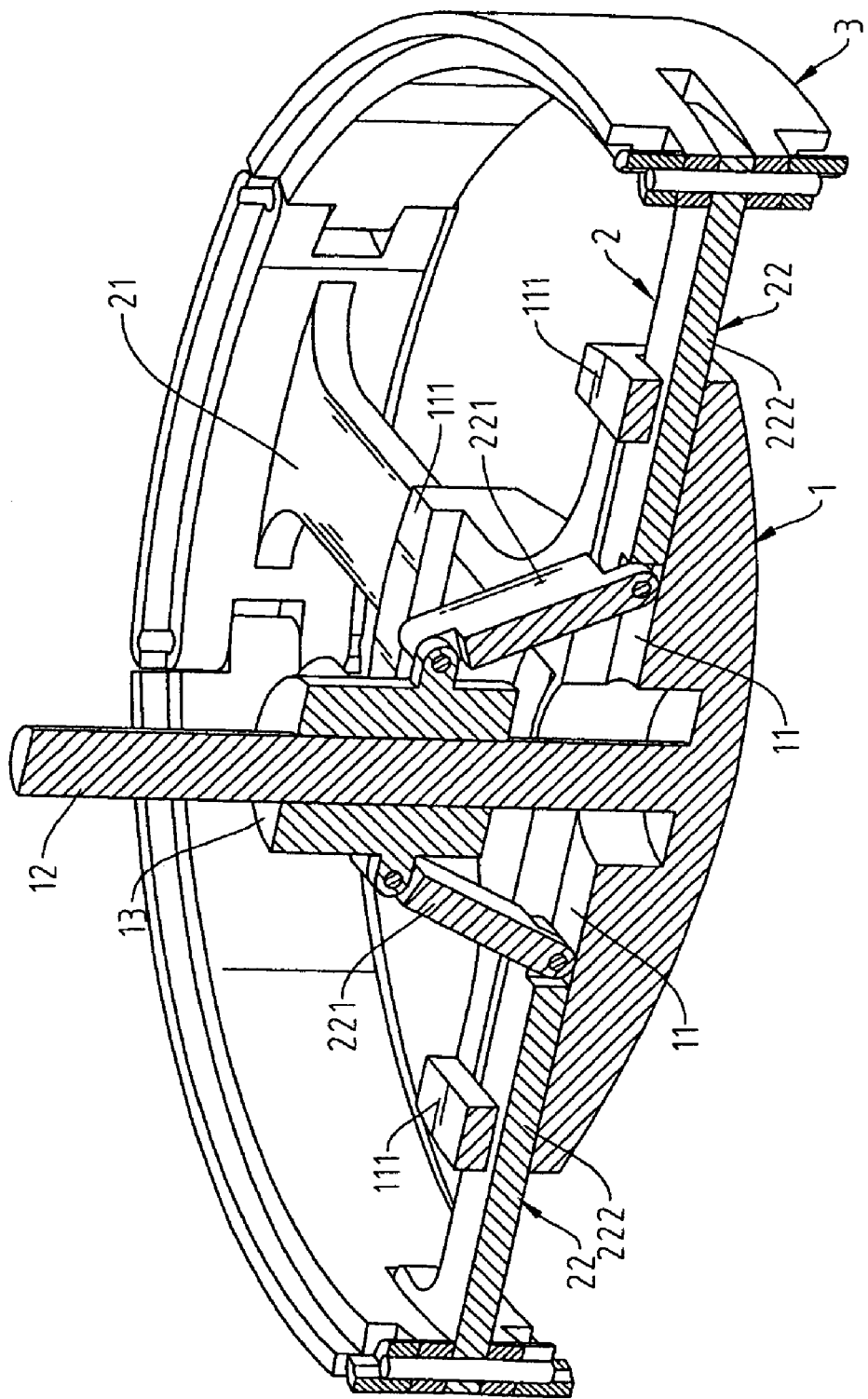
FIG. 4 is a sectional elevation of the present invention, showing the wheel for cart collapsed.

Referring to FIGS. 3 and 4 and FIG. 2 again, when in use, the rim 3 is kept in a circular status, the first spokes 21 and second spokes 22 of the spoke unit 2 are respectively fitted into the sliding ways 11 of the connector 1, and the retaining portions 131 of the hub 13 are respectively stopped against the first spokes 21. Therefore, the spokes 21 and 22 of the spoke unit 2 are respectively stopped between the rim 3 and the hub 13, supporting the rim 3 in shape for smooth rotation with the connector 1. When wishing to collapse the wheel, pull the retaining portions 131 to move the hub 13 along the shaft 12 in the direction away from the connector 1. At this time, the inner spoke segments 221 of the second spokes 22 are biased relative to the associating outer spoke segments 222, the outer spoke segments 222 are moved along the associating sliding way 11 in the direction towards the shaft 12, and therefore the rim 3 is collapsed into a flat manner for storage.

Figure 5:
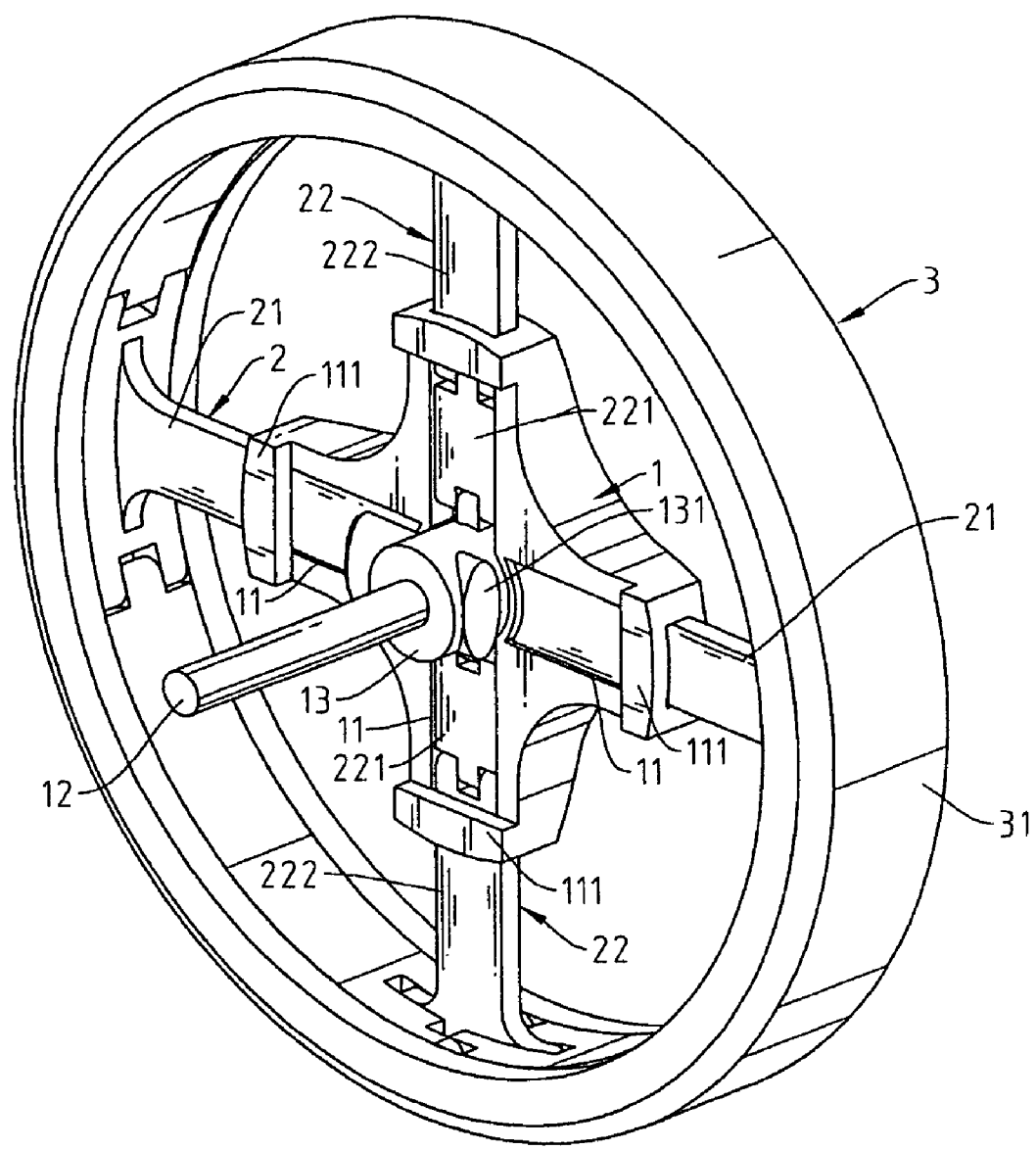
FIG. 5 corresponds to FIG. 1, showing a rubber layer mounted on the wheel.

Referring to FIG. 5, the rim 3 is peripherally covered with a rubber layer 31 for direct contact with the ground, smoothening rotation of the wheel on the ground.

Further, the vehicle in which the shaft 12 is installed can be a golf bag carrier, pushcart, or baby cart.

A prototype of collapsible wheel has been constructed with the features of FIGS. 1-5. The collapsible wheel functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A collapsible wheel installed in a vehicle, comprising:
   a rim formed of a plurality of ring elements that are pivotally connected in an endless series;
   a connector, said connector comprising a plurality of sliding ways arranged to extend towards a center of said connector, and a shaft perpendicularly extended from the center of said connector and pivotally connected to said vehicle;
   a hub sleeved onto said shaft; and
   a spoke unit connected between said rim and said hub, said spoke unit comprising a plurality of first spokes and a plurality of second spokes respectively movably attached to the sliding ways of said connector, each said first spoke comprising an outer end respectively fixedly connected to said rim and an inner end for stopping against the periphery of said hub, each said second spoke comprising an outer spoke segment fixedly connected to said rim and an inner spoke segment that has an end thereof hinged to a distal end of said outer spoke segment remote from said rim and an opposite end thereof hinged to said hub.

2. The collapsible wheel as claimed in claim 1, wherein said connector comprises a plurality of eye lugs respectively disposed at the ends of said sliding ways, said first spokes and said second spokes inserted through corresponding eye lugs.

3. The collapsible wheel as claimed in claim 1, wherein said hub comprises a plurality of retaining portions protruded from the periphery thereof for stopping said first spokes in the sliding ways of said connector.

4. The collapsible wheel as claimed in claim 1, further comprising a rubber layer covered on the periphery of said rim.

5. The collapsible wheel as claimed in claim 1, wherein said vehicle is a golf bag carrier.

6. The collapsible wheel as claimed in claim 1, wherein said vehicle is a pushcart.

7. The collapsible wheel as claimed in claim 1, wherein said vehicle is a baby cart.

\* \* \* \* \*